(12) United States Patent
Yun et al.

(10) Patent No.: US 11,731,071 B2
(45) Date of Patent: Aug. 22, 2023

(54) FILTER ASSEMBLY WITH MULTIPLE FILTER MEDIA

(71) Applicant: COWAY CO., LTD., Gongju-si (KR)

(72) Inventors: Hyun Jun Yun, Seoul (KR); Byong Hyoek Lee, Seoul (KR); Jong Cheol Kim, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 210 days.

(21) Appl. No.: 17/239,803

(22) Filed: Apr. 26, 2021

(65) Prior Publication Data

US 2021/0339185 A1 Nov. 4, 2021

(30) Foreign Application Priority Data

Apr. 29, 2020 (KR) .......................... 10-2020-0052576

(51) Int. Cl.
*B01D 46/62* (2022.01)
*B01D 46/52* (2006.01)
(Continued)

(52) U.S. Cl.
CPC ....... *B01D 46/522* (2013.01); *B01D 46/0001* (2013.01); *B01D 46/0005* (2013.01);
(Continued)

(58) Field of Classification Search
CPC .. B01D 46/521; B01D 46/10; B01D 2275/10; B01D 46/0001; Y10S 55/31
(Continued)

(56) References Cited

U.S. PATENT DOCUMENTS 5,989,303 A * 11/1999 Hodge ............... B01D 46/0032
 55/497
8,906,275 B2 * 12/2014 Davis ....................... D04H 3/14
 264/510

(Continued)

FOREIGN PATENT DOCUMENTS

KR 10-2005-0123442 A 12/2005
KR 10-2019-0014347 A 2/2019

*Primary Examiner* — Long T Tran
*Assistant Examiner* — James J Kim
(74) *Attorney, Agent, or Firm* — Oblon, McClelland, Maier & Neustadt, L.L.P.

(57) ABSTRACT

A filter assembly including: a first filter medium that is bent so that high-point portions and low-point portions defined based on a vertical plane with respect to a first direction are alternately and repeatedly formed in a second direction perpendicular to the first direction; a first filter frame configured to accommodate the first filter medium and to fix an edge side of the first filter medium; a second filter medium that is bent so that the low-point portions and the high-point portions based on the vertical plane with respect to the first direction are alternately and repeatedly formed in the second direction; and a second filter frame configured to accommodate the second filter medium and to fix an edge side of the second filter medium, wherein at least a portion of the high-point portions repeatedly formed in the first filter medium have different heights from those of the other high-point portions, and at least a portion of the low-point portions repeatedly formed in the second filter medium have different heights from those of the other low-point portions, and the first and second filter media are bent in such a way that a first filter medium high-point envelope connecting high points of the first filter medium and a second filter medium low-point envelope connecting low points of the second filter medium correspond to each other when viewed from a cross-section including the first direction and the (Continued)

second direction, and the first and second filter frames are combined with each other so that the first filter medium high-point envelope and the second filter medium low-point envelope face each other.

17 Claims, 13 Drawing Sheets

(51) Int. Cl.
*B01D 46/00* (2022.01)
*B01D 46/24* (2006.01)
*B01D 46/64* (2022.01)

(52) U.S. Cl.
CPC ......... *B01D 46/2403* (2013.01); *B01D 46/62* (2022.01); *B01D 46/64* (2022.01); *B01D 2265/04* (2013.01); *B01D 2275/206* (2013.01)

(58) Field of Classification Search
USPC .......................................................... 55/488
See application file for complete search history.

(56) References Cited

U.S. PATENT DOCUMENTS

2017/0333821 A1* 11/2017 Huang ................... B01D 46/10
2022/0339568 A1* 10/2022 Toyama ............... B01D 46/645

* cited by examiner

FIG. 8

| | | | | Top Layer (SECOND FILTER MEDIUM) | | | | | |
|---|---|---|---|---|---|---|---|---|---|
| | | | Grade | 12 | | | | | |
| | | | Shape | Normal | | Round | | Zigzag | |
| | Grade | Shape | Pitch | 3.8 | 4.2 | 3.8 | 4.2 | 3.8 | 4.2 |
| Bottom Layer (FIRST FILTER MEDIUM) | 12 | Normal (COMPARATIVE EXAMPLE) | 3.8 | | | | | | |
| | | | 4.2 | 1.8554 | | | | | |
| | | Round (FIRST EMBODIMENT) | 3.8 | | 1.6813 | 104.50 | | | |
| | | | 4.2 | | | 1.8539 | 106.65 | | |
| | | Zigzag (SECOND EMBODIMENT) | 3.8 | | | | 1.6798 | 109.04 | |
| | | | 4.2 | | | | | 1.8546 | |

FILTER ASSEMBLY WITH MULTIPLE FILTER MEDIA

CROSS-REFERENCE TO RELATED PATENT APPLICATION

This application claims the benefit of Korean Patent Application No. 10-2020-0052576, filed on Apr. 29, 2020, in the Korean Intellectual Property Office, the disclosure of which is incorporated herein in its entirety by reference.

BACKGROUND OF THE INVENTION

1. Field of the Invention

The present disclosure relates to a filter assembly with multiple filter media, and more particularly to a filter assembly in which multiple filter media bent in multiple stages are formed in a specific form and face one another so that a differential pressure can be reduced.

2. Description of the Related Art

Various types of filters are used in an air purifier according to the required performance of the air purifier to filter introduced air.

Among these filters, a high-efficiency particulate air (HEPA) filter is a type of high-performance filter that removes fine particles in the air, and filter media are bent in multiple stages to increase the area of the filter media (the filter area through which the air actually passes and is filtered).

Meanwhile, the performance and life of the filter are greatly affected by a 'differential pressure of the filter'. The differential pressure of the filter refers to a pressure difference between the upstream and the downstream of the filter based on the flow direction of a fluid. When the fluid containing contaminated particles passes through the filter, pores are clogged as the particles are collected in the pores of the filter, and the pressure gradually increases due to the closure of the pores. In general, as the period of use of the filter increases, the differential pressure increases naturally and gradually, and when the differential pressure reaches a certain point, the differential pressure increases rapidly. When the differential pressure increases rapidly, the flow rate of the filter decreases significantly. In general, this period is regarded as the replacement time of the filter.

As such, the differential pressure is one of the most significant factors in determining the performance and life of the filter. Therefore, it is very important to lower the differential pressure in order to stably maintain the performance of the filter and increase the usage period.

In order to improve the performance of the filter, various attempts have been made in the past. As a rather old part of the prior art, Korean Patent Laid-Open Publication No. 10-2005-0123442 discloses a "HEPA filter having sterilization function". The prior art discloses a configuration in which a catechin filter is bonded to one surface of a filter paper in the same shape as the cross-section of the filter paper (this refers to a filter medium). However, since this prior art is a HEPA filter including a single member, it has the effect of somewhat improving the filtration performance, but the differential pressure cannot be reduced.

As further prior art, Korean Patent Laid-Open Publication No. 10-2019-0014347 discloses a "filter member" having a configuration in which a plurality of HEPA filters having different filtration rate grades are combined. However, the prior art discloses a structure in which a main HEPA filter and an auxiliary HEPA filter are separable, thereby flexibly coping with environmental changes. However, because there is no disclosure of each shape and a coupling type, the effect of reducing the differential pressure is limited.

Accordingly, a filter structure is required which is capable of increasing the life of the filter by increasing the filtration performance of the filter and reducing the differential pressure.

(Patent document 1) Korean Patent Laid-open Publication No. 10-2005-0123442

(Patent document 2) Korean Patent Laid-open Publication No. 10-2019-0014347

SUMMARY OF THE INVENTION

The present disclosure provides a filter assembly in which a plurality of filter media are combined in a specific shape, rather than a filter assembly including a single filter medium.

The present disclosure also provides a filter assembly in which a plurality of filter media are combined in a specific shape so that a differential pressure can be reduced.

According to an aspect of the present disclosure, there is provided a filter assembly including: a first filter medium (110) that is bent so that high-point portions (111) and low-point portions (113) defined based on a vertical plane with respect to a first direction are alternately and repeatedly formed in a second direction perpendicular to the first direction; a first filter frame (130) configured to accommodate the first filter medium (110) and to fix an edge side of the first filter medium (110); a second filter medium (120) that is bent so that the low-point portions (121) and the high-point portions (123) defined based on the vertical plane with respect to the first direction are alternately and repeatedly formed in the second direction; and a second filter frame (140) configured to accommodate the second filter medium (120) and to fix an edge side of the second filter medium (120), wherein at least a portion of the high-point portions repeatedly formed in the first filter medium (110) have different heights from those of the other high-point portions, and at least a portion of the low-point portions repeatedly formed in the second filter medium (120) have different heights from those of the other low-point portions, and the first and second filter media (110, 120) are bent in such a way that a first filter medium high-point envelope (111a) connecting high points of the first filter medium (110) and a second filter medium low-point envelope (121a) connecting low points of the second filter medium (120) correspond to each other when viewed from a cross-section including the first direction and the second direction, and the first and second filter frames (130, 140) are combined with each other so that the first filter medium high-point envelope (111a) and the second filter medium low-point envelope (121a) face each other.

A predetermined gap (101) may be formed between the high-point portions (111) of the first filter medium and the low-point portions (121) of the second filter medium, and the gap (101) may be a distance between the first filter medium high-point envelope (111a) and the second filter medium low-point envelope (121a) and may be kept constant through combination of the first and second filter frames (130, 140).

Each of the first filter medium high-point envelope (111a) and the second filter medium low-point envelope (121a) may include a unit section formed in a preset shape, the unit section may be continuously repeated along the second direction, either one of the high-point portions (111) of the first filter medium or the low-point portions (121) of the second filter medium may include protruding portions that protrude in a direction in which they face each other, and the other one may include indentations that are indented in directions opposite to each other so as to correspond to the protruding portion.

The preset shape of the unit section may be a structure formed in a round shape having a predetermined curvature, and each of the first filter medium high-point envelope (111a) and the second filter medium low-point envelope (121a) may be formed to correspond to a preset curvature.

The fluid flowing through the filter assembly may flow from the second filter medium (120) to the first filter medium (110), and the first filter medium high-point envelope (111a) may protrude toward the second filter medium (120) with a predetermined curvature, and the second filter medium low-point envelope (121a) may be indented with the predetermined curvature.

All of the low-point portions (113) of the first filter medium may be positioned at the same heights, a maximum distance (h1) between the high-point portions (111) and the low-point portions (113) of the first filter medium may be formed to be greater than a maximum distance (h3) between the low-point portions (121) and the high-point portions (123) of the second filter medium, and a minimum distance (h2) between the high-point portions (111) and the low-point portions (113) of the first filter medium may be formed to be greater than a minimum distance (h4) between the low-point portions (121) and the high-point portions (123) of the second filter medium.

The maximum distance (h1) between the high-point portions (111) and the low-point portions (113) of the first filter medium may be between 10 mm and 50 mm, and the minimum distance (h2) between the high-point portions (111) and the low-point portions (113) of the first filter medium may be as in Equation 1 below:

$$\frac{h1}{2} < h2 < \frac{h1}{1.2}. \quad (1)$$

A total length (L1) of the first filter medium (110) based on the second direction may be between 100 mm and 500 mm, and a length (L2) of the unit section may be as in Equation 2 below:

$$\frac{1}{8} * L1 < L2 < \frac{1}{2} * L1. \quad (2)$$

Each of the first and second filter media (110, 120) may have a constant distance between adjacent low-point portions in the second direction, but may have a distance of 3.8 mm or 4.2 mm. A preset shape included in the first filter medium high-point envelope (111a) may include a rectangular protruding portion, and the first filter medium high-point envelope (111a) and the second filter medium low-point envelope (121a) may have a zigzag shape and may have a structure in which the first filter medium high-point envelope (111a) protrudes and the second filter medium low-point envelope (121a) is indented in succession.

Each of the first and second filter media (110, 120) may be formed by curing an adhesive member (150) partially applied to at least one surface of each of the first and second filter media (110, 120).

The adhesive member (150) may be applied along the second direction over the high-point portions (111, 123) and the low-point portions (113, 121) for each of the first and second filter media (110, 120).

According to an aspect of the present disclosure, there is provided a method of forming a bent structure of filter media, the method including: pre-marking filter media at preset intervals by using a vertical strike method (S110); performing pleating so that the filter media are bent in multiple stages and high-point portions and low-point portions of the filter media are repeatedly formed in a second direction (S120); heating the filter media pleat-processed in (b) (S130); and fixing a bent shape of the filter media using a hot melt while supporting the bent portion with a finger blade so that the bent shape of the filter media is maintained.

According to another aspect of the present disclosure, there is provided a filter assembly including: inner and outer filter media (210, 220), which are bent in multiple stages so that high-point portions and low-point portions of the inner and outer filter media (210, 220) are repeatedly formed in a circumferential direction and which are wound based on a vertical central axis (201) in the shape of a tube extending in a direction of the virtual central axis (201) and in each of the inner and outer filter media (210, 220), based on a vertical cross-section of the virtual central axis (201), the high-point portions that are outer points and the low-point portions that are inner points are repeated; and upper and lower frames (230, 240) in which the inner filter medium (210) and the outer filter medium (220) are respectively accommodated and which cover upper and lower ends of the inner and outer filter media (210, 220) based on a direction of the virtual central axis (201), wherein the inner and outer filter media (210, 220), based on a vertical cross-section of the virtual central axis (201), an outer envelope (211a) connecting high-point portions (211) of the inner filter medium (210) and an inner envelope (221a) connecting low-point portions (221) of the outer filter medium (220) are formed to correspond to each other, and the upper and lower frames (230, 240) are combined with each other so that the outer envelope (211a) and the inner envelope (221a) face each other.

A predetermined gap (202) may be formed between the high-point portions (211) of the inner filter medium and the low-point portions (221) of the outer filter medium, and the gap (202) may be a distance between the outer envelope (211a) of the inner filter medium (210) and the inner envelope (221a) of the outer filter medium (220) and may be kept constant through combination of the inner and outer filter frames (230, 240).

Each of the outer envelope (211a) of the inner filter medium (210) and the inner envelope (221a) of the outer filter medium (220) may include a unit section formed in a preset shape, the unit section may be continuously repeated along the second direction, either one of the high-point portions (211) of the inner filter medium or the low-point portions (221) of the outer filter medium may include protruding portions that protrude in a direction in which they face each other, and the other one may include indentations that are indented in directions opposite to each other so as to correspond to the protruding portion.

The preset shape of the unit section may be a structure formed in a round shape having a predetermined curvature, and each of the outer envelope (211a) of the inner filter medium (210) and the inner envelope (221a) of the outer filter medium (220) may be formed to correspond to a preset curvature.

BRIEF DESCRIPTION OF THE DRAWINGS

The above and other features and advantages of the present disclosure will become more apparent by describing in detail exemplary embodiments thereof with reference to the attached drawings in which:

FIG. 8 shows a result of an experiment of a differential pressure in the form of FIGS. 6 and 7 together with an embodiment of the present disclosure;

DETAILED DESCRIPTION OF THE INVENTION

Figure 1:
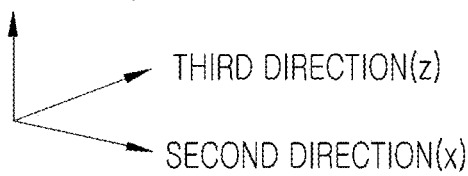
FIG. 1 is an overall perspective view of a filter assembly according to an embodiment of the present disclosure.
Figure 1:
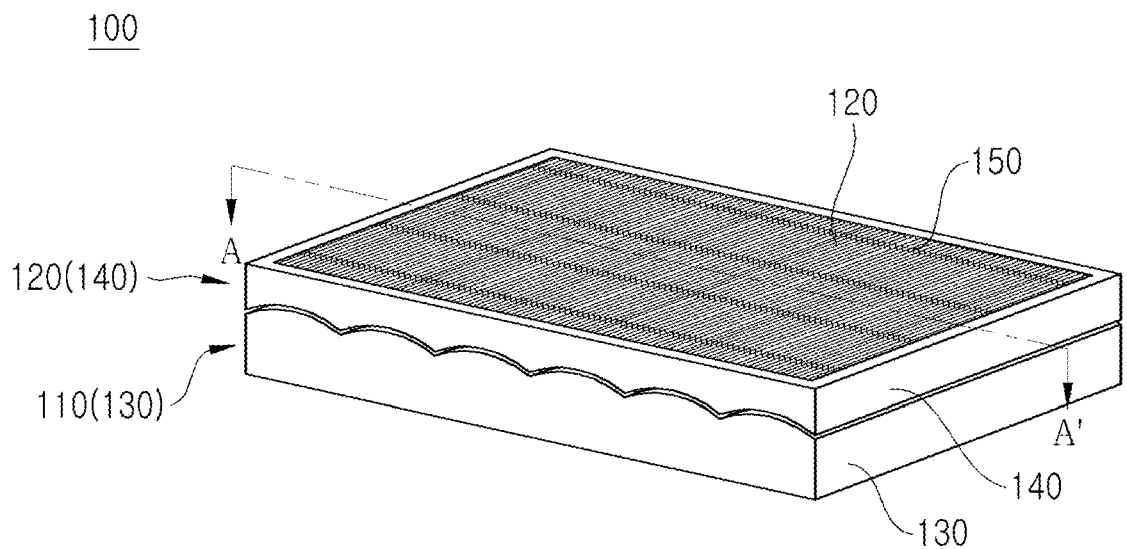

Hereinafter, a filter assembly according to the present disclosure will be described with reference to the drawings. In the present specification, singular expressions include plural expressions unless the context clearly indicates otherwise. In addition, a "first direction" as defined herein refers to a vertical direction (y-axis) with respect to a plane, and a "second direction" refers to a horizontal direction (x-axis) perpendicular to the first direction. In particular, the second direction refers to a direction in which a filter medium is bent in multiple stages among horizontal directions. In addition, a direction (z-axis) perpendicular to both the first and second directions is defined as a "third direction".

However, because the first through third directions are defined for convenience of description, it is specified in advance that the filter assembly according to the present disclosure can be rotated and used according to a user's selection and the structure of a device.

Filter Assembly Structure

A filter assembly formed by combining filter media having round cross-sections, which is an embodiment of the present disclosure, will be described with reference to FIGS. 1 through 4.

A filter assembly 100 according to an embodiment of the present disclosure includes a first filter medium 110, a first filter frame 130, a second filter medium 120, and a second filter frame 140.

The first and second filter media 110 and 120 are bent in such a way that high-point portions 111 and 123 and low-point portions 113 and 121 defined based on a vertical plane with respect to the first direction are alternately and repeatedly formed in the second direction. Hereinafter, it is described that the high-point portions 111 and 123 and the low-point portions 113 and 121 are alternately repeated, which simply means that the high-point portions—the low-point portions—the high-point portions—the low-point portions are repeatedly formed and does not mean that they are repeated at the same heights and in the same form.

In FIGS. 1 through 4, a filter medium positioned at a lower side is the first filter medium 110, and a filter medium positioned at an upper side is the second filter medium 120, and the following description will be made based on the position.

Figure 3A:
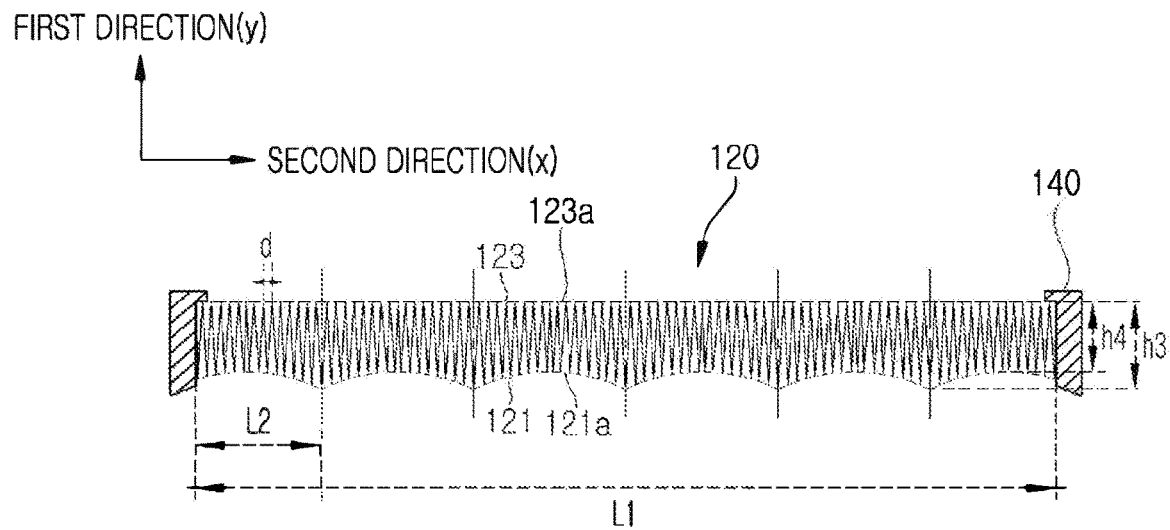
FIG. 3A is a cross-sectional view of a first filter frame taken along line A-A' of FIG. 1.
Figure 3B:
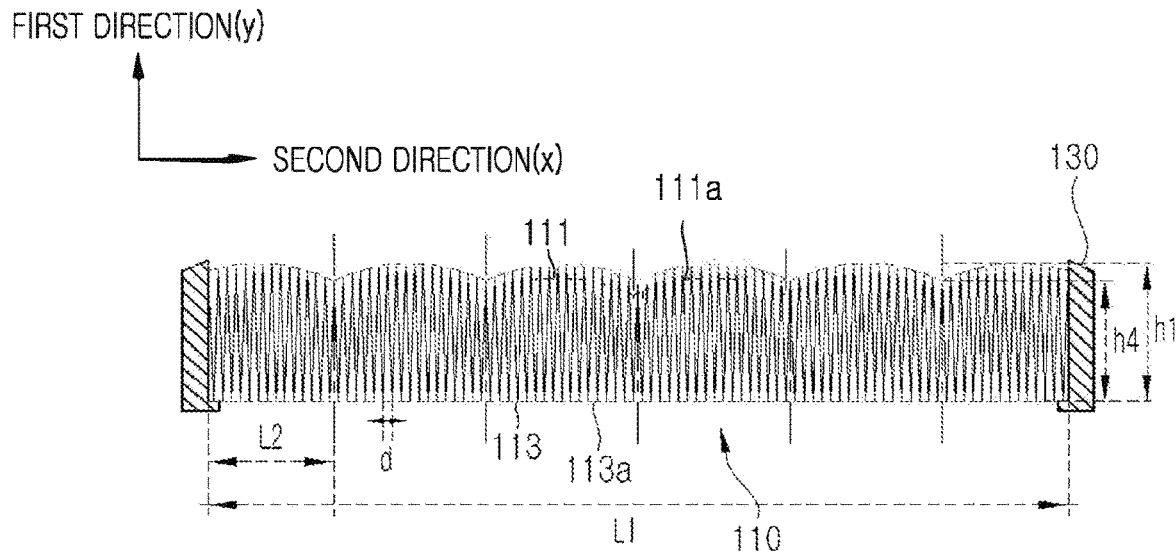
FIG. 3B is a cross-sectional view of a second filter frame taken along line A-A' of FIG. 1.
Figure 4:
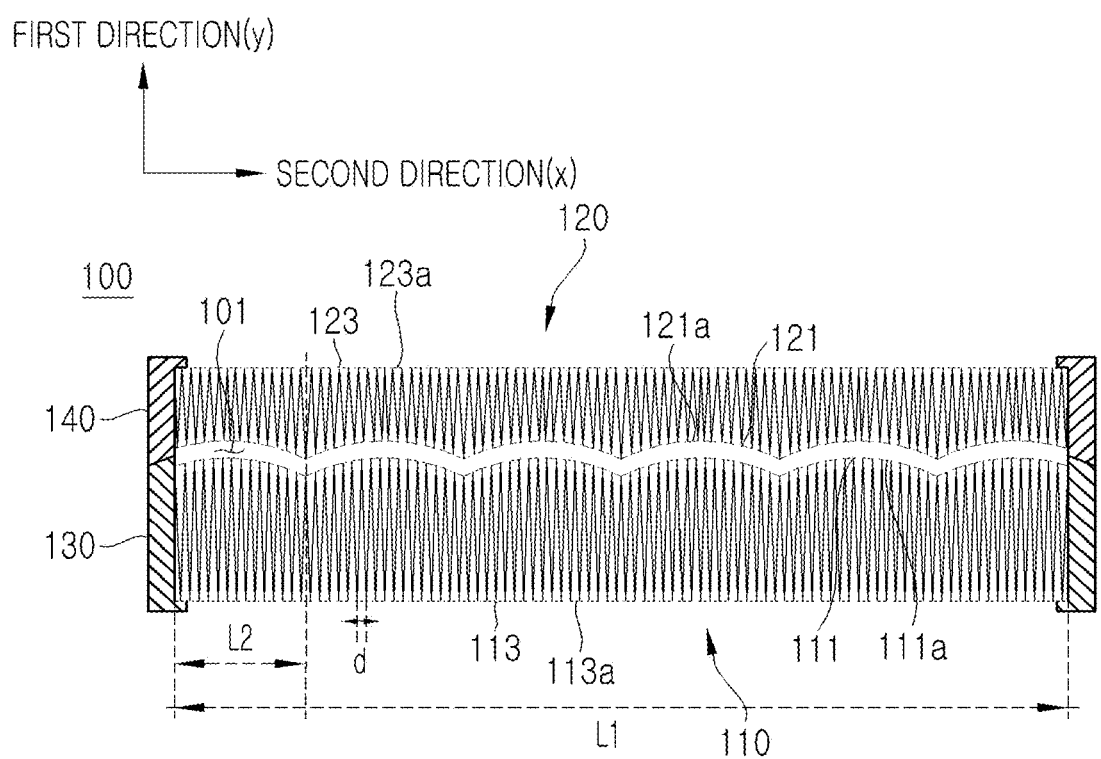
FIG. 4 is a cross-sectional view showing a state in which the first and second filter frames are combined, taken along line A-A' of FIG. 1.

In the first filter medium 110, the high-point portions 111 and the low-point portions 113 are repeatedly formed based on the vertical plane with respect to the first direction. That is, the high-point portions 111 and the low-point portions 113 are defined based on the vertical plane among planes including the first direction, the high-point portions 111 refer to upper bent portions, and the low-point portions 113 refer to lower bent portions. Referring to FIGS. 3 and 4, showing a vertical section, the high-point portions 111 and the low-point portions 113 are represented by an apex. Here, each of the high-point portions 111 and the low-point portions 113 refer to bent lines that extend by a certain length in the third direction (z-axis).

The second filter medium 120 is also the same as the first filter medium 110 described above, and redundant description thereof will be omitted. A first filter medium high-point envelope 111*a* and a second filter medium low-point envelope 121*a* are virtual lines and are used to describe a combined form of the high-point portions 111 of the first filter medium 110 and the low-point portions 121 of the second filter medium 120.

The first and second filter media 110 and 120 are bent in such a way that the first filter medium high-point envelope 111*a* connecting high points of the first filter medium 110 and the second filter medium low-point envelope 121*a* connecting low points of the second filter medium 120 face each other when viewed from a cross-section including both the first and second directions. In this case, at least a portion of the high-point portions 111 repeatedly formed in the first filter medium 110 are formed to be different in height from the other high-point portions, and at least a portion of the low-point portions 121 repeatedly formed in the second filter medium 120 are formed to be different in height from the other low-point portions. That is, both the first filter medium high-point envelope 111a and the second filter medium low-point envelope 121a are not flat (or straight), but have a predetermined curved shape.

The high-point portions 111 of the first filter medium 110 positioned at the lower side are formed to face the low-point portions 121 of the second filter medium 120 positioned at the upper side and have a shape in which the high-point portions 111 of the first filter medium 110 and the low-point portions 121 of the second filter medium 120 are engaged with each other. Here, a predetermined gap 101 is formed between the high-point portions 111 of the first filter medium 110 and the low-point portions 121 of the second filter medium 120. That is, the engaged shape means a structure in which the high-point portions 111 of the first filter medium 110 and the low-point portions 121 of the second filter medium 120 are formed to correspond to each other while the gap 101 therebetween is maintained. The first and second filter media 110 and 120 face each other in an engaged shape so that even when an external force in a horizontal direction is applied, the alignment of the first and second filter media 110 and 120 can be prevented from being distorted, and a more rigid combined state against external impact can be maintained.

The first filter medium high-point envelope 111a and the second filter medium low-point envelope 121a are formed to maintain a predetermined distance, and an empty space formed therebetween means the gap 101. The gap 101 is kept constant through the combination of the first and second filter frames 130 and 140 to be described later.

The gap 101 is a very significant factor to reduce the differential pressure. Through the appropriate gap 101, a fluid that has passed through the second filter medium 120 may be uniformly distributed to the gap 101 before passing through the first filter medium 110. Accordingly, a strong fluid pressure can be prevented from being applied to a specific position of the first and second filter media 110 and 120, and by using the entire area of the filter media, the life of the filter assembly 100 can be extended.

Figure 2:
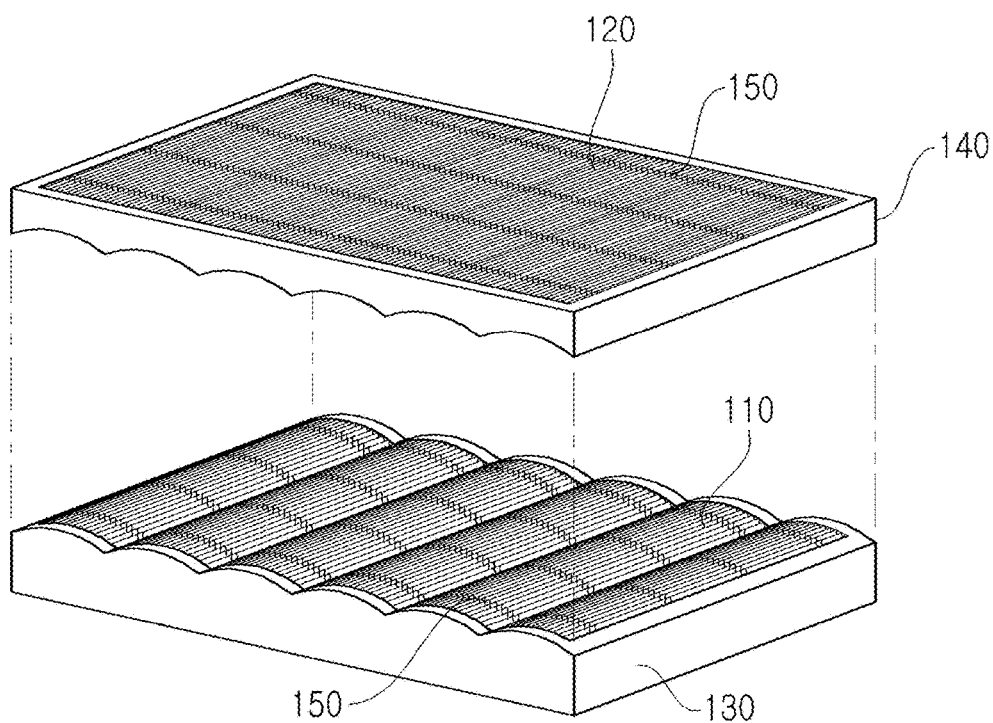
FIG. 2 is an exploded perspective view of FIG. 1.

The shapes of the first filter medium high-point envelope 111a and the second filter medium low-point envelope 121a will be described in more detail with reference to FIGS. 2 through 4.

Each of the first filter medium high-point envelope 111a and the second filter medium low-point envelope 121a includes a "unit section" formed in a preset shape, and the unit section is continuously repeated along the second direction. In this case, either of the high-point portions 111 of the first filter medium 110 or the low-point portions 121 of the second filter medium 120 include protruding portions that protrude in a direction in which they face each other, and the other thereof include indentations that are indented in directions opposite to each other so as to correspond to the protruding portion. As described above, the high-point portions 111 of the first filter medium 110 or the low-point portions 121 of the second filter medium 120 have a structure in which they are engaged with each other while the gap 101 is maintained. Thus, a portion indented into the low-point portions 121 of the second filter medium 120 is formed at a portion from which the high-point portions 111 of the first filter medium 110 protrude, and is formed to be indented by the protruding portion.

In this regard, the filter assembly 100 according to the present disclosure presents two embodiments.

In a first embodiment, the preset shape of the unit section is a structure formed in a round shape having a predetermined curvature. Descriptions of the first embodiment will be provided with reference to FIGS. 3 and 4.

Specifically, each of the first filter medium high-point envelope 111a and the second filter medium low-point envelope 121a is formed to correspond to a preset curvature. In order for the first filter medium high-point envelope 111a and the second filter medium low-point envelope 121a to be engaged with each other, they are preferably formed with the same curvature at positions where they face each other. In other words, in the first embodiment, each unit section constitutes a unit wave, and the unit wave is repeated as a whole.

Meanwhile, it is preferable that all of the low-point portions 113 of the first filter medium 110 are positioned at the same heights, and all of the high-point portions 123 of the second filter medium 120 are also positioned at the same heights. That is, each of the first filter medium low-point envelope 113a and the second filter medium high-point envelope 123a is formed in a linear shape and is formed in a structure without unevenness. In this way, the filter assembly 100 is formed in a rectangular parallelepiped shape so that compatibility can be improved compared to a relatively uneven shape, and can be used in various air purifiers (can be used in all devices in which filters are used other than air purifiers). However, the first filter medium low-point envelope 113a and the second filter medium high-point envelope 213a may be designed to correspond to the environment and structure of mounting portions of the filter assembly 100 of the air purifier.

With respect to a distance between the high-point portions and the low-point portions of each of the first and second filter media 110 and 120, a maximum distance h1 between the high-point portions 111 and the low-point portions 113 of the first filter medium 110 is formed to be greater than a maximum distance h3 between the low-point portions 121 and the high-point portions 123 of the second filter medium 120.

In addition, a minimum distance h2 between the high-point portions 111 and the low-point portions 113 of the first filter medium 110 is formed to be greater than a minimum distance h4 between the low-point portions 121 and the high-point portions 123 of the second filter medium 120. That is, this means that the first filter medium 110 and the second filter medium 120 are not formed to have the same sizes, and there is a difference in length (meaning a difference in thickness) in the first direction.

Here, it is preferable that the fluid flowing through the filter assembly 100 flows from the second filter medium 120 to the first filter medium 110. That is, the structure is a structure in which the fluid is first filtered by the second filter medium 120 formed to be relatively thin and then finally filtered and discharged secondarily by the first filter medium 110 formed to be relatively thick. In this way, based on the flow direction of the fluid, the fluid is first filtered in a structure having a small area (meaning the second filter medium 120) and then finally filtered in a structure having a large area (meaning the first filter medium 110) so that the filtration performance of the filter assembly 100 can be further enhanced.

With respect to the length in the first direction, the maximum distance h1 between the high-point portions 111 and the low-point portions 113 of the first filter medium 110 described above is between 10 mm and 50 mm, and the minimum distance h2 between the high-point portions 111 and the low-point portions 113 of the first filter medium 110 is as in Equation 1 below.

$$\frac{h1}{2} < h2 < \frac{h1}{1.2} \qquad (1)$$

With respect to the length in the second direction, a total length L1 of the first filter medium 110 is preferably formed to be between 100 mm and 500 mm. Here, a length L2 of the unit section is as in Equation 2 below. Of course, the total length of the second filter medium 120 and the length of the unit section are also the same as the first filter medium 110.

$$\frac{1}{8} * L1 < L2 < \frac{1}{2} * L1 \qquad (2)$$

In addition, each of the first and second filter media 110 and 120 has a constant distance d between adjacent low-point portions in the second direction, but has a distance of 3.8 mm or 4.2 mm. When the distance is less than 3.8 mm, it means that the first and second filter media 110 and 120 are bent too tightly in multiple stages. Thus, it is too difficult for the fluid to pass through the first and second filter media 110 and 120, and there is a problem in that the fan output needs to be increased excessively for passage. When the distance exceeds 4.2 mm, it means that the area of the filter medium is reduced, and thus the filtration performance may be deteriorated.

Figure 5:
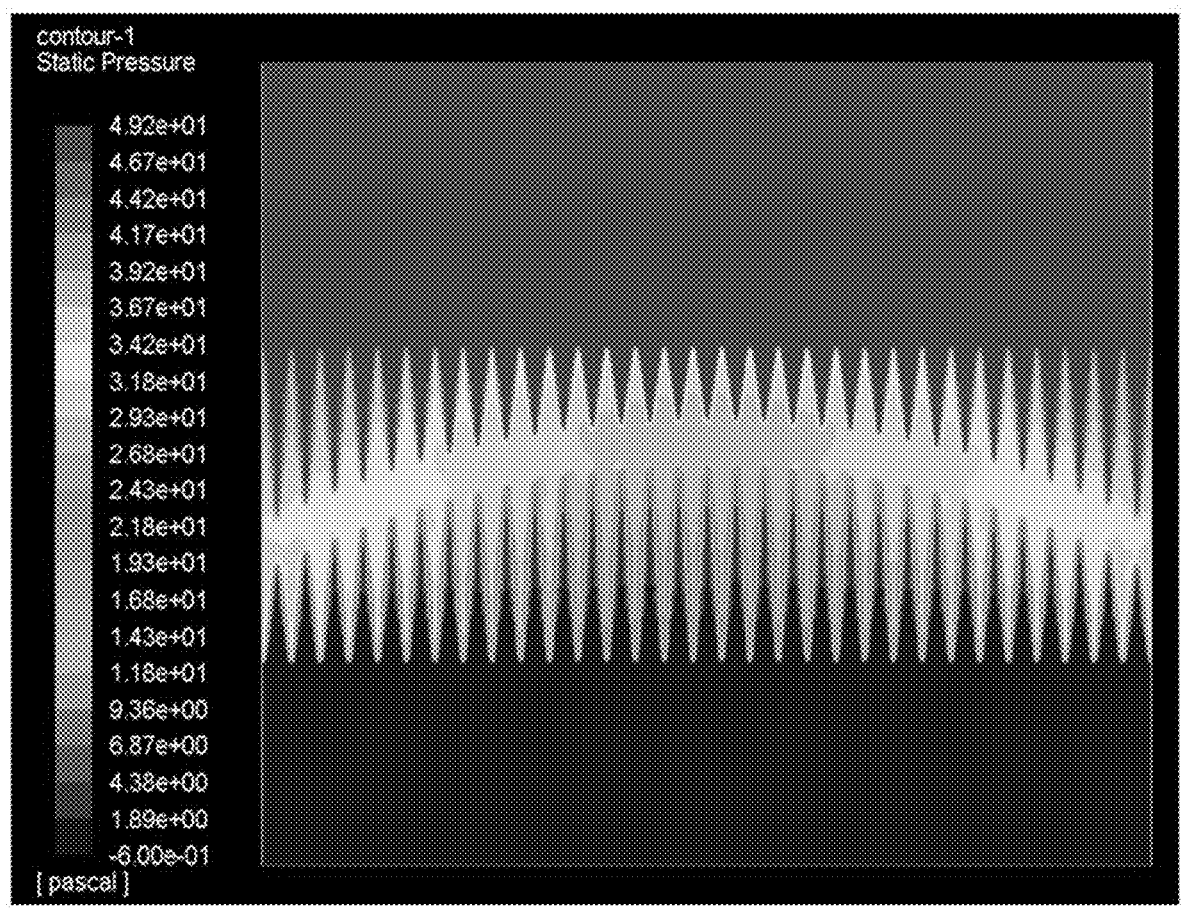
FIG. 5 is a graph showing computational fluid dynamics (CFD) modeling performed by using an embodiment of the present disclosure.

FIG. 5 is a graph showing computational fluid dynamics (CFD) modeling performed by using an embodiment of the present disclosure. Referring to FIG. 5, it can be seen that the flow of the fluid is relatively concentrated in the center of the unit section based on the second direction. Because the fluid flows from the second filter medium 120 to the first filter medium 110, the fluid is concentrated in the middle of the second filter medium 120 having the thinnest thickness. In FIG. 5, it can be visually confirmed that the fluid is distributed in both directions along the gap between the first and second filter media 110 and 120, and the fluid is distributed in both directions so that the effect of reducing the differential pressure can be achieved.

Figure 6:
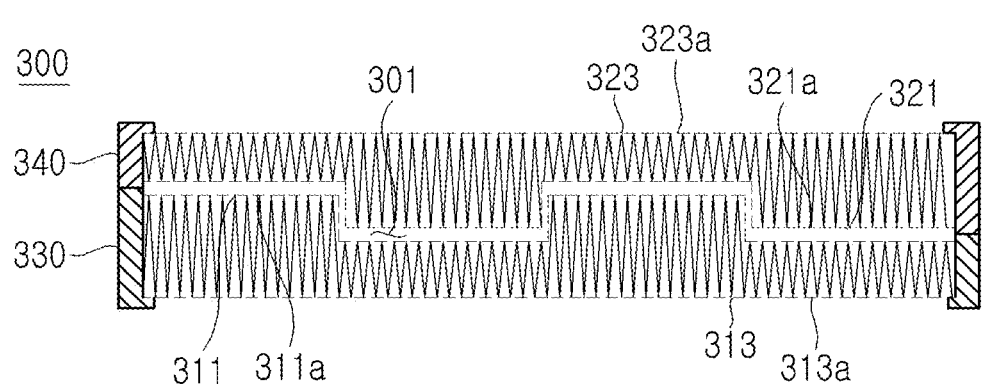
FIG. 6 schematically illustrates a cross-section of a filter assembly in which each of a first filter medium high-point envelope and a second filter medium low-point envelope is in a zigzag shape, according to another embodiment of the present disclosure.

A second embodiment of the unit section type will be described with reference to FIG. 6.

In the second embodiment, a preset shape included in the first filter medium high-point envelope 111*a* includes a rectangular protruding portion. Specifically, it refers to a structure in which a first filter medium high-point envelope 311*a* and a second filter medium low-point envelope 321*a* have a zigzag shape. The structure is a structure in which the first filter medium high-point envelope 311*a* protrudes and the second filter medium low-point envelope 321*a* is indented in succession.

Because in a single unit section, the heights of high-point portions 311 of a first filter medium 310 are the same, the first filter medium high-point envelope 311*a* has a straight-line shape. In addition, a second filter medium 320 also has the same heights of the low-point portions 321 of the second filter medium 320. In the second embodiment, as described above, a gap 301 is formed between the first filter medium high-point envelope 311*a* and the second filter medium low-point envelope 321*a,* and the gap 301 is kept constant.

Figure 7:
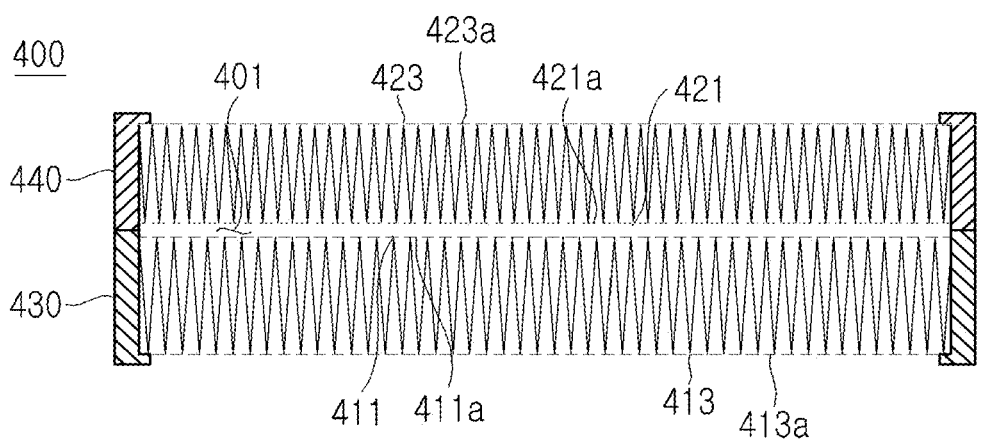
FIG. 7 schematically illustrates a cross-section of a filter assembly in which each of high-point portions and low-point portions are formed at the same heights, as a comparative example (simple stack structure) of the present disclosure.

A comparative example of the unit section type will be described with reference to FIG. 7. In the comparative example, unlike the first and second embodiments described above, a first filter medium high-point envelope 411*a* and a second filter medium low-point envelope 421*a* are not curved. That is, as a structure in which the first filter medium 410 and the second filter medium 420 are simply stacked, it is difficult to regard this as a combined structure.

FIG. 8 shows differential pressure test data for each of the first and second embodiments and the comparative example described above in a table. This differential pressure test data is a result of using the first and second filter media 110 and 120 of 12 grades, and is a result in which a distance (pitch) d between neighboring low-point portions is set to 3.8 mm and 4.2 mm based on the second direction.

As shown in the differential pressure test data of FIG. 8, it can be seen that the first embodiment in a round shape has a lower differential pressure compared to the second embodiment and the comparative example. Regarding the distance d between neighboring low-point portions, it can be seen that the difference pressure reduction effect is higher when 3.8 mm is set in the first embodiment compared to a case where 4.2 mm is set.

The filter assembly 100 according to the present disclosure includes a first filter frame 130 for fixing the edge side of the first filter medium 110 and a second filter frame 140 for fixing the edge side of the second filter medium 120.

Because the first filter medium 110 is accommodated in the first filter frame 130, the size and shape of the first filter frame 130 correspond to the first filter medium 110. This is also the case for the second filter frame 140.

The heights of the first and second filter frames 130 and 140 may be formed to be greater than the heights of the first and second filter media 110 and 120 respectively accommodated therein. This is to keep the above-described gap 101 constant while considering the spatial margin for the size of the first and second filter media 110 and 120. This is because the gap between the first and second filter media 110 and 120 is maintained by the coupling of the first and second filter frames 130 and 140. The first and second filter frames 130 and 140 may be coupled in such a manner that a hook is fastened to a groove, but the present disclosure is not limited thereto, and various known coupling methods may be applied.

Meanwhile, for the first and second filter media 110 and 120 constituting the filter assembly100. according to the present disclosure, filter media of different grades may be used. The grade here means a filtration rate grade, and by forming the first and second filter media 110 and 120 into different grades, it is possible to respond flexibly to environmental changes and further improve the use life of a filter.

In addition, the filter assembly 100 may be configured to be used by the user by replacing only the first filter medium 110 or the second filter medium 120 of the filter assembly 100. Because the fluid flows from the second filter medium 120 to the first filter medium 110, the second filter medium 120 needs to be replaced, but the first filter medium 110 does not require replacement. In this case, the user or a manager does not replace all of them, but selects and replaces only the filter medium that needs to be replaced, thereby improving economic efficiency.

A material of the first and second filter media 110 and 120 may include a filter medium for a dust collection filter or a filter medium for a high-efficiency particulate air (HEPA) filter that is bent and used to increase the area of the filter medium. However, if it is bendable as a filter for filtering introduced air, its type and material are not limited. In addition, the first and second filter media 110 and 120 may be used alone as the HEPA filter medium, but the present disclosure is not limited thereto, and a plurality of filter materials may be stacked and used. For example, the HEPA filter medium and the dust collection filter medium may be stacked together, or two types of HEPA filter media having different pore sizes may be used in a stacked structure.

Figure 9A:
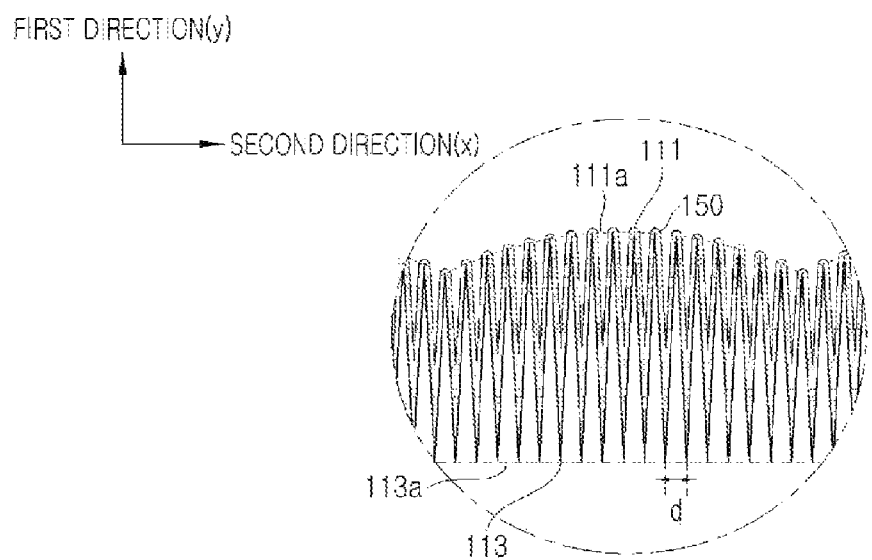
FIGS. 9A and 9B illustrate an application form of an adhesive member in an embodiment of the present disclosure.
Figure 9B:
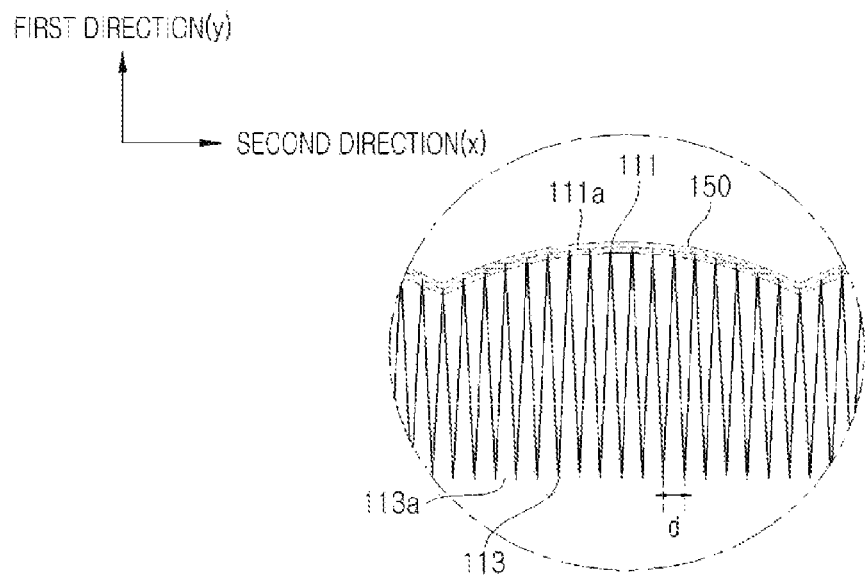
Figure 10:
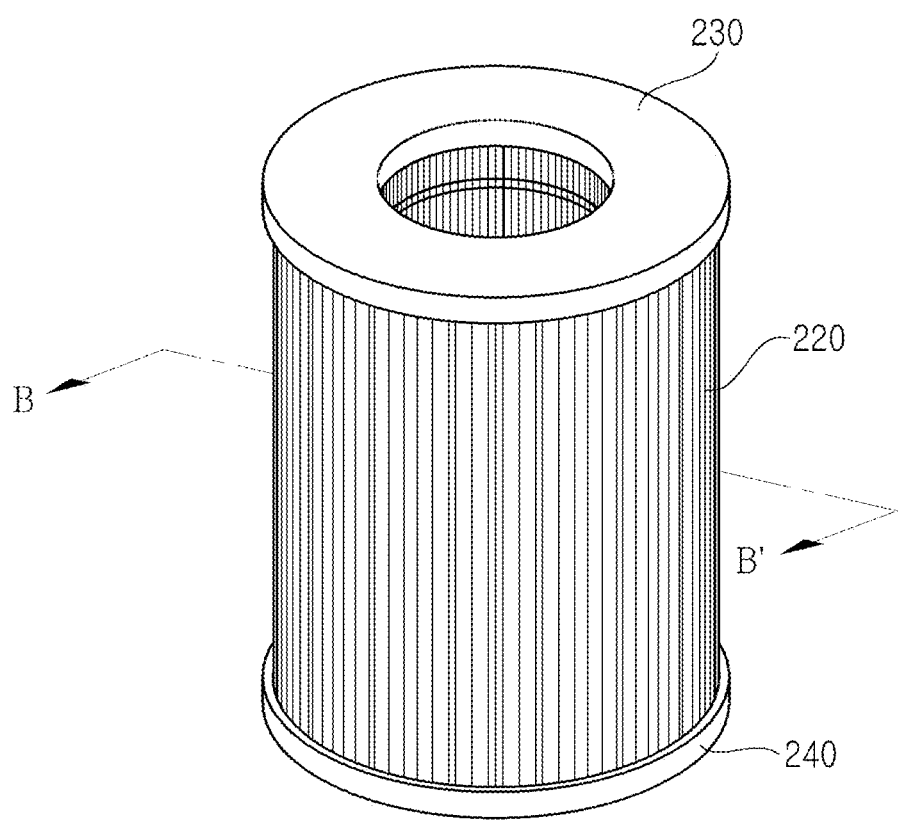
FIG. 10 is an overall perspective view according to another embodiment of the present disclosure.
Figure 11:
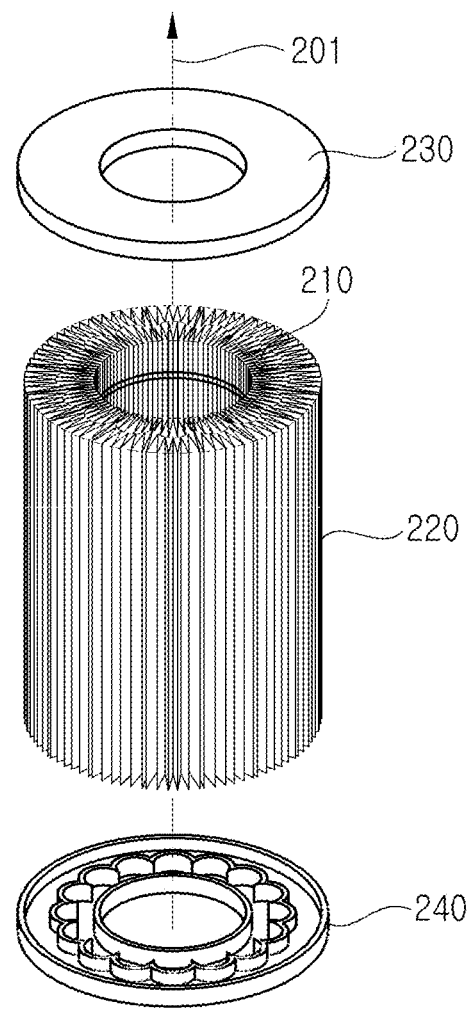
FIG. 11 illustrates a state in which only upper and lower filter frames are separated from the exploded perspective view of FIG. 10 (meaning a state in which inner and outer filter media are combined)
Figure 12:
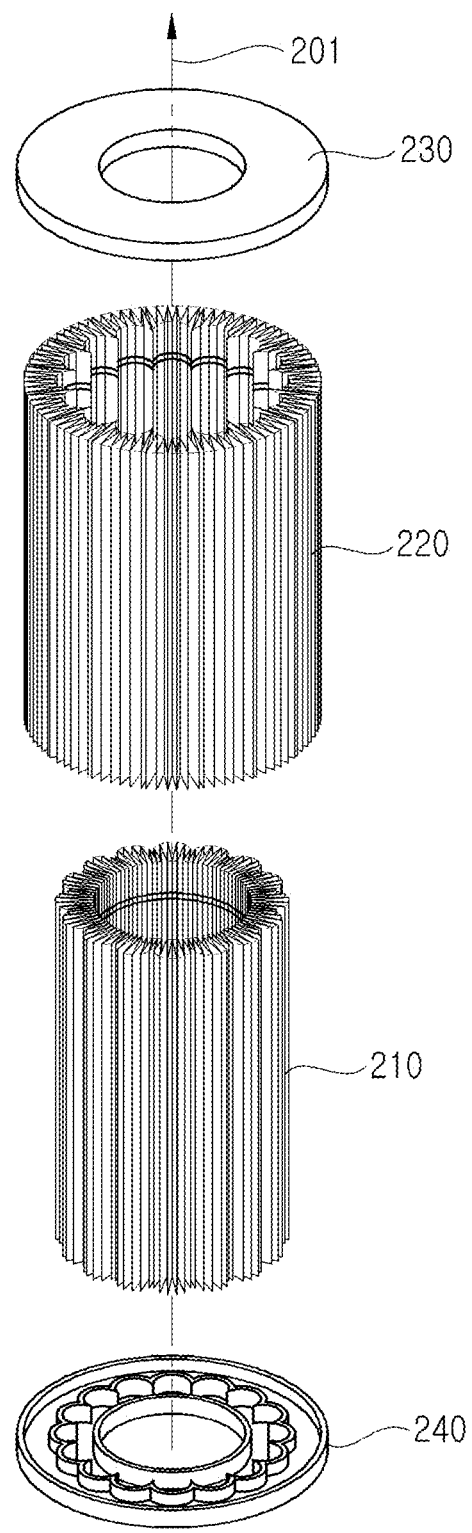
FIG. 12 illustrates a state in which the inner and outer filter media are also separated in the state of FIG. 11.
Figure 13:
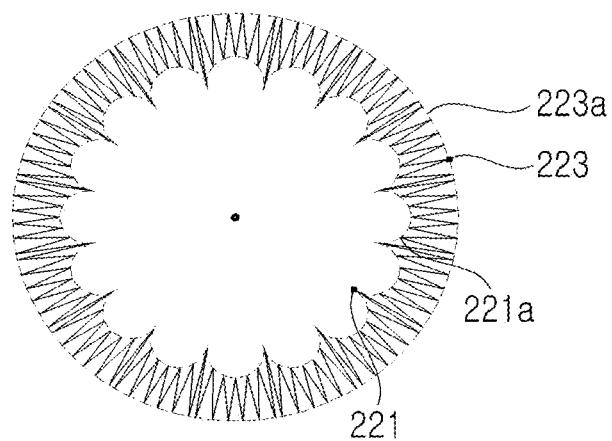
FIG. 13 is a cross-sectional view of the outer filter medium taken along line B-B' of FIG. 10.
Figure 14:
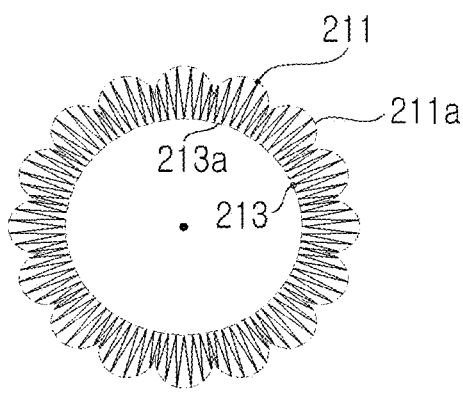
FIG. 14 is a cross-sectional view of the inner filter medium taken along line B-B' of FIG. 10.
Figure 15:
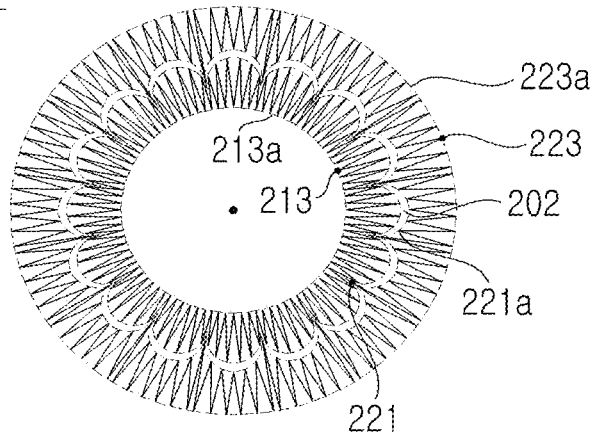
FIG. 15 is a cross-sectional view illustrating a state in which the outer and inner filter media of FIG. 10 are combined, taken along line B-B'.

Meanwhile, referring to FIGS. 9A and 9B, a form of applying an adhesive member 150 for maintaining the bent shape of the first and second filter media 110 and 120 is shown. In the filter assembly 100 according to the present disclosure, the adhesive member 150 is used to maintain a shape in which the filter media are bent in multiple stages, and the bent shape is firmly maintained by the adhesive member 150. In this case, the adhesive member 150 is applied along the second direction over the high-point portions 111 and 123 and the low-point portions 113 and 121 for each of the first and second filter media 110 and 120.

FIG. 9A shows a form in which the adhesive member 150 is also filled in the valleys formed between adjacent high-point portions 111, and FIG. 9B shows a form in which only the high-point portions 111 are connected to one another with the adhesive member 150.

The number of portions to which the adhesive member 150 is applied and the shape of the application may be variously configured according to a designer's selection. However, because the portion to which the adhesive member 150 is applied acts to provide resistance during blowing, the number and thickness of the applied portions are preferably minimized within the limit for maintaining the bent shape of the first and second filter media 110 and 120. Meanwhile, when the adhesive member 150 is applied on both sides, it is also possible for it to be applied at different heights. As an example, the adhesive member 150 may be made of a hot melt that is cured after being applied in a molten state. However, when the bent shape of the first and second filter media 110 and 120 can be maintained, materials of various materials and compositions can be used.

Cylindrical Filter Assembly Structure

Hereinafter, a filter assembly according to another embodiment of the present disclosure will be described with reference to FIGS. 10 through 16.

The embodiments shown in FIGS. 10 through 16 have a cylindrical structure and are in the form of a tube in which an inner filter medium 210 and an outer filter medium 220 are engaged with each other.

A filter assembly 200 according to another embodiment of the present disclosure includes the inner filter medium 210, the outer filter medium 220, an upper frame 230, and a lower frame 240.

The inner filter medium 210 and the outer filter medium 220 are bent in multiple stages so that the high-point portions 211 and 223 and the low-point portions 213 and 221 are repeatedly formed in a circumferential direction, and the inner filter medium 210 and the outer filter medium 220 are wound based on a virtual central axis 201 in the shape of a tube extending in the direction of the virtual central axis 201.

In this case, each of the inner filter medium 210 and the outer filter medium 220 is in the shape in which, based on a vertical cross-section of the virtual central axis 201, the high-point portions 211 and 223, which are outer points, and the low-point portions 213 and 221, which are inner points, are repeated.

An "outer envelope 211a of the inner filter medium 210" refers to the shape of a curved line formed as a whole when the high-point portions 211 of the inner filter medium 210 are connected, and an "inner envelope 221a of the outer filter medium 220" refers to the shape of a curved line formed as a whole when the low-point portions 221 of the outer filter medium 220 are connected.

Specifically, the outer envelope 211a connecting the outer points of the inner filter medium 210 and the inner envelope 221a connecting the inner points of the outer filter medium 220 are formed to correspond to each other, and upper and lower frames 230 and 240 of the filter assembly 200 are combined with each other so that the outer envelope 211a and the inner envelope 221a face each other.

Each of the outer envelope 211a of the inner filter medium 210 and the inner envelope 221a of the outer filter medium 220 includes a unit section having a preset shape. The unit section is continuously repeated while rotating 360 degrees with respect to the virtual central axis 201 along the circumferential direction.

The preset shape of the unit section is the same as in the above-described embodiment, and redundant descriptions thereof will be omitted. The preset shape of the unit section is formed in a round shape (or wave shape) having a predetermined curvature. That is, a wave-shaped arc has a shape that is periodically repeated. In addition, the outer envelope 211a of the inner filter medium 210 and the inner envelope 221a of the outer filter medium 220 are formed to correspond to each other with a preset curvature.

Meanwhile, the inner envelope 213a of the inner filter medium 210 and the outer envelope 223a of the outer filter medium 220 may be formed as circles (concentric circles) having the same curvature. Unlike the above-described embodiment, all of the low points of the inner filter medium 210 are arranged on a virtual circumference, and all of the high points of the outer filter medium 220 are arranged on the virtual circumference. That is, the inner envelope 213a of the inner filter medium 210 and the outer envelope 223a of the outer filter medium 220 have the shapes of concentric circles with different diameters.

However, this does not exclude the above-described zig-zag unit section shape (meaning the "second embodiment") from being applied to the cylindrical filter assembly 200, and a zigzag unit section shape may also be applied.

In the cylindrical filter assembly 200, the outer envelope 211a of the inner filter medium 210 and the inner envelope 221a of the outer filter medium 220 may be considered as a concept corresponding to the high-point envelope 111a of the first filter medium 110 and the low-point envelope 121a of the second filter medium 120 of the above-described embodiment, respectively.

The cylindrical filter assembly 200 has a structure in which the outer envelope 211a of the inner filter medium 210 and the inner envelope 221a of the outer filter medium 220 are mutually engaged with each other while forming a predetermined gap 202 therebetween.

Each of the upper and lower frames 230 and 240 covers both the inner filter medium 110 and the outer filter medium 120. Specifically, based on the direction of the virtual central axis 201, the upper frame 230 covers the upper ends of the inner and outer filter media 210 and 220, and the lower frame 240 covers the lower ends of the inner and outer filter media 210 and 220. In the process of covering, the inner and outer filter media 210 and 220 serve to fix the structure in which the inner and outer filter media 210 and 220 are engaged with each other to be firmly maintained.

In the description based on the upper frame 230, the upper frame 230 includes an inner guide wall 231 that protrudes from the upper frame 230 by a predetermined height and spatially separates the inner and outer filter media 210 and 220, and an outer guide wall 233 that is formed at the edge of the upper frame 230 so as to prevent separation of the outer filter medium 220. Accordingly, the upper frame 230 is divided into a support portion 235 of the inner filter medium 210 and a support portion 234 of the outer filter medium 220. By using the inner guide wall 231, the gap 202 is kept constant between the inner and outer filter media 210 and 220.

Figure 16:
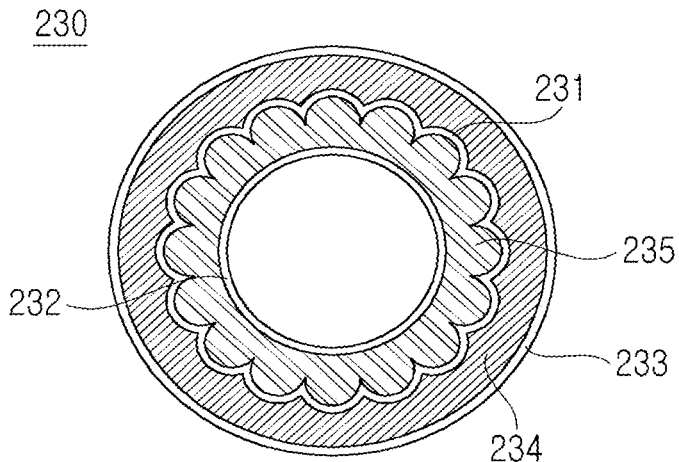
FIG. 16 is a plan view of an upper frame of FIG. 10.

Here, the upper and lower frames 230 and 240 are not limited to the shape shown in FIG. 16, and any shape in which the inner filter medium 210 and the outer filter medium 220 are rigidly fixed may be used.

In addition, the curvature of each of the inner envelope 213a of the inner filter medium 210 and the outer envelope 223a of the outer filter medium 220, the thickness of the inner filter medium 210, the thickness of the outer filter medium 220, a distance between high-point portions and low-point portions of the inner filter medium 210, and a distance between high-point portions and low-point portions of the outer filter medium 220 may be selected as optimum values depending on the required filtration performance and an air purifier to be mounted.

Method of Forming Bent Structure of Filter Media

Figure 17:
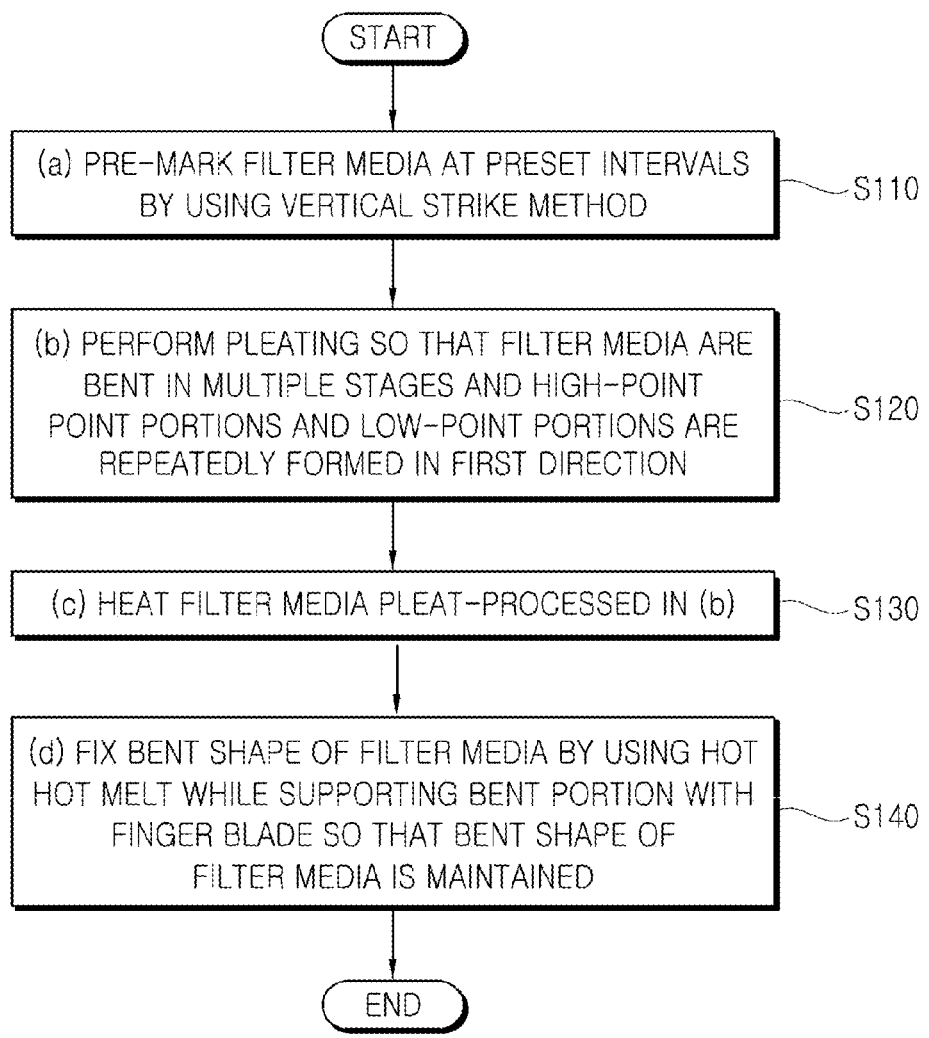
FIG. 17 is a flowchart illustrating a method of forming a bent structure of filter media according to the present disclosure.

A method of forming a bent structure of filter media will be described with reference to FIG. 17.

The method of forming the bent structure of the filter media according to the present disclosure includes operations S110 through S140.

Operation S110 is an operation of pre-marking filter media at preset intervals by using a vertical strike method. As described above, in the filter media applied to the present disclosure, a high-point envelope or a low-point envelope of the filter media is formed in a round shape (or wave shape) or in a zigzag shape. Thus, the filter media are not continuously equally pre-marked at regular intervals, and in order to maintain the shape, the filter media are pre-marked at different intervals according to a preset condition.

Operation S120 is an operation of performing pleating so that the filter media are bent in multiple stages and high-point portions and low-point portions of the filter media are repeatedly formed in the second direction. The pleat-processing means processing to form wrinkles, and the filter media are bent in multiple stages based on the pre-marking set in operation S110. By performing pleating, the area of the filter media can be increased, and accordingly, the filtration performance can be improved.

Operation S130 is an operation of heating the filter media pleat-processed in operation S120. In order to more firmly maintain the shape of the bent filter media, heating is performed, and infrared rays are preferably used for deep heat conduction.

Operation 140 is an operation of fixing the bent shape of the filter media using a hot melt while supporting the bent portion with a finger blade so that the bent shape of the filter media is more strongly maintained. The finger blade is inserted inside the bent portion (meaning the high-point portions and the low-point portions) and is used to apply an external force in a bending direction. By using the hot melt to fix the bent shape of the filter media in a state in which the bent shape is more sharply formed using the finger blade, a phenomenon in which the bent portion collapses during a hot melt application process can be prevented.

The present disclosure described above has the following effects.

A filter assembly according to the present disclosure has a shape in which a plurality of filter media are engaged with one another while facing one another, filtration performance can be improved, and simultaneously, only filter media that have reached the end of their life can be selectively replaced, and thus, comfort can be provided to users, and economic efficiency can be enhanced.

In addition, in the filter assembly according to the present disclosure, because a plurality of filter media are engaged with one another in a specific shape, the differential pressure, which is directly connected to the life of the filter, can be reduced.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A filter assembly comprising:
   a first filter medium that is bent so that high-point portions and low-point portions defined based on a vertical plane with respect to a first direction are alternately and repeatedly formed in a second direction perpendicular to the first direction;
   a first filter frame configured to accommodate the first filter medium and to fix an edge side of the first filter medium;
   a second filter medium that is bent so that low-point portions and high-point portions of the second filter medium defined based on the vertical plane with respect to the first direction are alternately and repeatedly formed in the second direction; and
   a second filter frame configured to accommodate the second filter medium and to fix an edge side of the second filter medium,
   wherein at least a portion of the high-point portions repeatedly formed in the first filter medium have different heights from those of the other high-point portions, and at least a portion of the low-point portions repeatedly formed in the second filter medium have different heights from those of the other low-point portions, and
   the first and second filter media are bent in such a way that a first filter medium high-point envelope connecting high points of the first filter medium and a second filter medium low-point envelope connecting low points of the second filter medium correspond to each other when viewed from a cross-section including the first direction and the second direction, and
   the first and second filter frames are combined with each other so that the first filter medium high-point envelope and the second filter medium low-point envelope face each other.

2. The filter assembly of claim 1, wherein a predetermined gap is formed between the high-point portions of the first filter medium and the low-point portions of the second filter medium, and the gap is a distance between the first filter medium high-point envelope and the second filter medium low-point envelope and is kept constant through combination of the first and second filter frames.

3. The filter assembly of claim 2, wherein each of the first filter medium high-point envelope and the second filter medium low-point envelope comprises a unit section formed in a preset shape, the unit section is continuously repeated along the second direction, either one of the high-point portions of the first filter medium or the low-point portions of the second filter medium comprise protruding portions that protrude in a direction in which they face each other, and the other one comprise indentations that are indented in directions opposite to each other so as to correspond to the protruding portion.

4. The filter assembly of claim 3, wherein the preset shape of the unit section is a structure formed in a round shape having a predetermined curvature, and each of the first filter medium high-point envelope and the second filter medium low-point envelope is formed to correspond to a preset curvature.

5. The filter assembly of claim 4, wherein fluid flowing through the filter assembly flows from the second filter medium to the first filter medium, and the first filter medium high-point envelope protrudes toward the second filter medium with a predetermined curvature, and the second filter medium low-point envelope is indented with the predetermined curvature.

6. The filter assembly of claim 5, wherein all of the low-point portions of the first filter medium are positioned at the same heights, a maximum distance (h1) between the high-point portions and the low-point portions of the first filter medium is formed to be greater than a maximum distance (h3) between the low-point portions and the high-point portions of the second filter medium, and a minimum distance (h2) between the high-point portions and the low-point portions of the first filter medium is formed to be greater than a minimum distance (h4) between the low-point portions and the high-point portions of the second filter medium.

7. The filter assembly of claim 6, when the maximum distance (h1) between the high-point portions and the low-point portions of the first filter medium is between 10 mm and 50 mm, and the minimum distance (h2) between the high-point portions and the low-point portions of the first filter medium is as in Equation 1 below:

$$\frac{h1}{2} < h2 < \frac{h1}{1.2}. \tag{1}$$

8. The filter assembly of claim 6, wherein a total length (L1) of the first filter medium based on the second direction is between 100 mm and 500 mm, and a length (L2) of the unit section is as in Equation 2 below:

$$\frac{1}{8}*L1 < L2 < \frac{1}{2}*L1. \tag{2}$$

9. The filter assembly of claim 6, wherein each of the first and second filter media has a constant distance between adjacent low-point portions in the second direction, but has a distance of 3.8 mm or 4.2 mm.

10. The filter assembly of claim 3, wherein a preset shape included in the first filter medium high-point envelope comprises a rectangular protruding portion, the first filter medium high-point envelope and the second filter medium low-point envelope have a zigzag shape and has a structure in which the first filter medium high-point envelope protrudes and the second filter medium low-point envelope is indented in succession.

11. The filter assembly of claim 1, wherein each of the first and second filter media is formed by curing an adhesive member (150) partially applied to at least one surface of each of the first and second filter media.

12. The filter assembly of claim 11, wherein the adhesive member is applied along the second direction over the high-point portions and the low-point portions for each of the first and second filter media.

13. A method of forming a bent structure of filter media, the method comprising:
pre-marking filter media at preset intervals by using a vertical strike method;
performing pleating so that the filter media are bent in multiple stages and high-point portions and low-point portions of the filter media are repeatedly formed in a second direction;
heating the pleat processed filter media; and
fixing a bent shape of the filter media using a hot melt while supporting the bent portion with a finger blade so that the bent shape of the filter media is maintained.

14. A filter assembly comprising:
inner and outer filter media, which are bent in multiple stages so that high-point portions and low-point portions of the inner and outer filter media are repeatedly formed in a circumferential direction and which are wound based on a vertical central axis in the shape of a tube extending in a direction of the virtual central axis and in each of the inner and outer filter media, based on a vertical cross-section of the virtual central axis, the high-point portions that are outer points and the low-point portions that are inner points are repeated; and
upper and lower frames in which the inner filter medium (210) and the outer filter medium are respectively accommodated and which cover upper and lower ends of the inner and outer filter media based on a direction of the virtual central axis,
wherein in the inner and outer filter media, based on a vertical cross-section of the virtual central axis, an outer envelope connecting high-point portions of the inner filter medium and an inner envelope connecting low-point portions of the outer filter medium are formed to correspond to each other, and the upper and lower frames are combined with each other so that the outer envelope and the inner envelope face each other.

15. The filter assembly of claim 14, wherein a predetermined gap is formed between the high-point portions of the inner filter medium and the low-point portions of the outer filter medium, and the gap is a distance between the outer envelope of the inner filter medium and the inner envelope of the outer filter medium and is kept constant through combination of the inner and outer filter frames.

16. The filter assembly of claim 15, wherein each of the outer envelope of the inner filter medium and the inner envelope of the outer filter medium comprises a unit section formed in a preset shape, the unit section is continuously repeated along the second direction, either one of the high-point portions of the inner filter medium or the low-point portions of the outer filter medium comprise protruding portions that protrude in a direction in which they face each other, and the other one comprise indentations that are indented in directions opposite to each other so as to correspond to the protruding portion.

17. The filter assembly of claim 16, wherein the preset shape of the unit section is a structure formed in a round shape having a predetermined curvature, and each of the outer envelope of the inner filter medium and the inner envelope of the outer filter medium is formed to correspond to a preset curvature.

* * * * *